United States Patent
Jung

(10) Patent No.: US 7,912,357 B2
(45) Date of Patent: Mar. 22, 2011

(54) METHOD OF AND APPARATUS FOR STORING A PROGRAM

(75) Inventor: Choon-sik Jung, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1403 days.

(21) Appl. No.: 10/067,301

(22) Filed: Feb. 7, 2002

(65) Prior Publication Data

US 2003/0021590 A1     Jan. 30, 2003

(30) Foreign Application Priority Data

Jul. 25, 2001    (KR) .............................. 2001-0044858

(51) Int. Cl.
     *H04N 5/783*      (2006.01)
(52) U.S. Cl. ........ 386/351; 386/346; 386/348; 369/47.1
(58) Field of Classification Search ............. 375/240.24, 375/240.28; 386/52, 68, 46, 95, 124–126, 386/70, 109, 111, 112, 239, 248, 343–348, 386/358, 353; 725/93; 369/47.1, 47.21, 369/59.25, 275.1
See application file for complete search history.

(56) References Cited

U.S. PATENT DOCUMENTS

| | | | |
|---|---|---|---|
| 5,899,578 A * | 5/1999 | Yanagihara et al. | 386/75 |
| 6,215,746 B1 * | 4/2001 | Ando et al. | 369/53.2 |
| 6,360,057 B1 * | 3/2002 | Tsumagari et al. | 386/95 |
| 6,654,421 B2 * | 11/2003 | Hanamura et al. | 375/240.26 |
| 6,704,359 B1 * | 3/2004 | Bayrakeri et al. | 375/240.12 |
| 6,782,189 B2 * | 8/2004 | Ando et al. | 386/68 |
| 7,106,946 B1 * | 9/2006 | Kato | 386/69 |

\* cited by examiner

*Primary Examiner* — Thai Tran
*Assistant Examiner* — Mishawn Dunn
(74) *Attorney, Agent, or Firm* — Staas & Halsey LLP

(57) ABSTRACT

A method and apparatus for creating a program table that has information associated with playing a TV program and storing the program table with program data. Program packets related to the TV program are extracted from an encoded MPEG-2 transport stream (TS) and stored. A TS demultiplexer extracts the program packets related to a program desired to be stored from TS packets under control of a TS demultiplexer control unit which also extracts location information of an I-picture. A program table having information related to playing the TV program and the location information of the I-picture is generated and the program table is stored together with the TV program so that subsequent play and trick play of the stored TV program are more easily performed by referring to the program table.

8 Claims, 6 Drawing Sheets

(1) TS STREAM WRITE TO MAIN MEMORY
(2) INTERRUPT TO TS DEMUX CONTROL UNIT
(3) IPE CONTROLLER SETTING
(4) TS PACKET, PROGRAM TABLE OF SELECTED PROGRAM WRITE TO HDD

METHOD OF AND APPARATUS FOR STORING A PROGRAM

CROSS REFERENCE TO RELATED APPLICATIONS

This application claims the benefit of Korean Application No. 2001-44858 filed Dec. 11, 2001 in the Korean Patent Office, the disclosure of which is incorporated herein by reference.

BACKGROUND OF THE INVENTION

1. Field of the Invention

The present invention relates to a method of and an apparatus for storing a TV program, and more particularly, to a method of and an apparatus for creating a program table that has information associated with reproducing the TV program and storing the program table with program data.

2. Description of the Related Art

FIG. 1 is a block diagram of a structure of a prior art digital television receiving and/or storing apparatus. A general digital broadcast receiving and/or storing system for receiving, storing, and playing a digital television broadcast is formed with a TS demux 102 which receives a Transport Stream (TS) encoded and packetized according to the MPEG-2 standard, extracts program packets related to a desired TV program from the received TS stream, and extracts an Audio/Video (A/V) elementary stream from the extracted program packets, a storing apparatus 104 which stores program packets associated with the TV program that is desired to be stored, a digital interface 106 which transmits to and/or receives from the storing apparatus 104, a control apparatus 108 which controls the demux 102, the digital interface 106 and the storing apparatus 104, an audio decoder 110 which reproduces an audio signal from the A/V elementary stream provided by the TS demux 102, and a video decoder 112 which reproduces a video signal from the A/V elementary stream.

An operation for storing a TV program in the digital television receiving and/or storing apparatus of FIG. 1 will now be explained. Program packets that were multiplexed into a transport stream are demultiplexed by the TS demux 102. The program packets are provided through the digital interface 106 to the storing apparatus 104 where the packets are stored.

Meanwhile, an operation for playing the TV program in the digital television receiving and/or storing apparatus of FIG. 1 will now be explained. The program packets stored in the storing apparatus 104 are input to the TS demux 102 through the digital interface 106. The input program packets are converted to an A/V elementary stream by the TS demux 102, and the A/V elementary stream is output through the audio decoder 110 and video decoder 112 so that the TV program is played. Here, the control apparatus 108 controls processes for storing and playing the program by the TS demux 102, the digital interface 106, and the storing apparatus 104.

A TS stream is formed with TS packets, each of which is 188 bytes long, and a kind of a TS packet is distinguished by a Packet Identifier (PID). A Program Allocation Table (PAT) includes the PID of a TS packet having a Program Map Table (PMT) which includes the PIDs of TS packets having audio and/or video information related to the TV program. Therefore, in order to demultiplex a TS stream into program packets related to a predetermined TV program, both PAT and PMT information should be known.

Meanwhile, in order to perform trick plays such as Fast Find (FF) and Rewind (REW), a location of an Intra-picture (I-picture) that is a standard for playing a Group of Pictures (GOP) should be known. The location of the I-picture is determined by a picture start code and a picture type code.

In the digital television receiving and/or storing apparatus shown in FIG. 1, where a TV program is stored in the storage apparatus 106, only program packets related to the TV program, each of which has a TS packet shape, are stored. Therefore, where the TV program stored in the storing apparatus 106 is played, reference information for playing the TV program, for example, the PAT, the PMT, and the location of the I-picture, must be extracted from read program packets. However, since the PAT and the PMT are scattered in the TS stream, a delay in reconstructing the PAT and the PMT is encountered, thus slowing down quick play. Accordingly, the structure of the apparatus for playing the TV program becomes complicated and processing delays occur.

SUMMARY OF THE INVENTION

To solve the above problems, it is a first object of the present invention to provide a method of storing a TV program, in which in response to the TV program being stored, reference information that is referred to in playing the TV program is arranged in a table and the table is stored together with the TV program in the storing apparatus so that the TV program is played by referring to information in the table. By referring to the table, play and trick play are performed more quickly and efficiently.

It is a second object of the present invention to provide an apparatus for storing a TV program and reference information which is referred to in playing the TV program.

Additional objects and advantages of the invention will be set forth in part in the description which follows, and, in part, will be obvious from the description, or may be learned by practice of the invention.

To accomplish the first and other objects of the present invention, there is provided a method of storing program data, which is encoded by compression. The method comprises: extracting information, which is referred to in reproducing the program data, from the program data; making a table of the extracted information; and storing the table having the extracted information and the program data in a storage apparatus.

Preferably, in the extracting of the information, location information of an I-picture for variable speed play is extracted. It is preferable that in the extracting of the information, description information of each pack and location information of an I-picture for variable speed play are extracted.

Preferably, the program data is encoded by compression according to the MPEG-2 standard and packetized in the form of a transport stream (TS) and in the extracting of the information, a program allocation table (PAT), a program map table (PMT), and location information of an I-picture for variable speed play are extracted.

To accomplish the second and other objects of the present invention, there is provided an apparatus for storing a program, in which program packets related to a program are extracted from a transport stream (TS), which is encoded and TS-packetized according to the MPEG-2 standard, and stored. The apparatus for storing a program comprises a TS demux which extracts program packets related to a program desired to be stored from TS packets; a TS demux control unit which controls the TS demux to extract program packets, and which extracts location information of an I-picture for variable speed play; a control unit which buffers and outputs program packets detected by the TS demux, extracts PAT and PMT information related to the program desired to be stored from the program packets, and makes a program table having the extracted PAT and PMT information and the location information of a packet related to the I-picture detected by the TS demux control unit; and a storing apparatus which stores the program packets and program table provided by the control unit.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
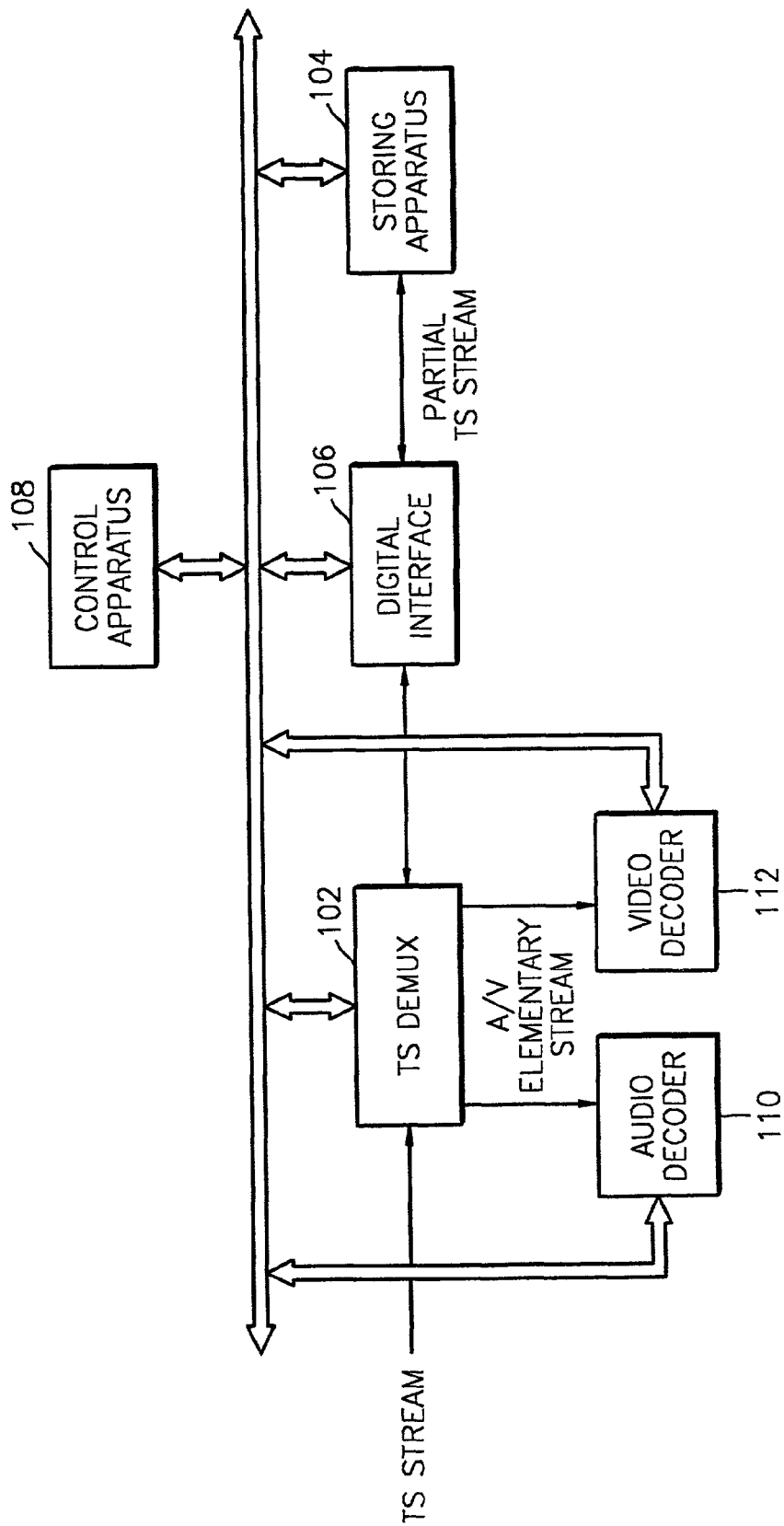
FIG. 1 is a block diagram of the structure of a conventional digital television receiving and/or storing apparatus.

Reference will now be made in detail to the present embodiments of the present invention, examples of which are illustrated in the accompanying drawings, wherein like reference numerals refer to like elements throughout.

Figure 2:
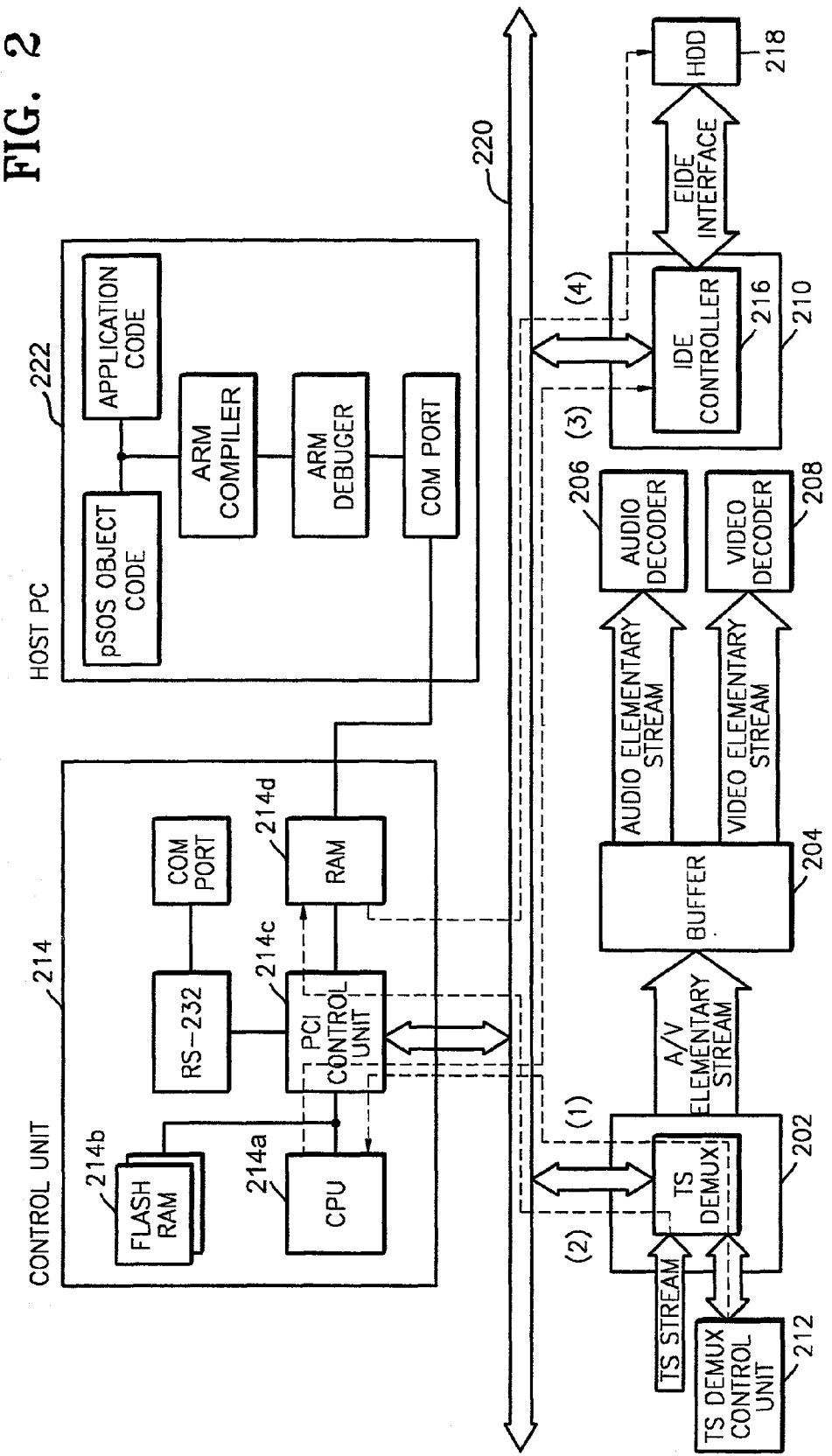
FIG. 2 is a block diagram of the structure of an embodiment of a digital television receiving and/or storing apparatus according to the present invention.

An embodiment of a digital television receiving and/or storing apparatus according to the present invention shown in FIG. 2 is implemented in a Peripheral Communication Interface (PCI) card which is embeddable inside a computer. The apparatus of FIG. 2 comprises a TS demux 202, a buffer 204, an audio decoder 206, a video decoder 208, a digital interface unit 210, a TS demux control unit 212, a control unit 214, and a Hard Disc Drive (HDD) 218.

A storing operation by the apparatus of FIG. 2 will now be explained. The TS demux 202 extracts program packets having information related to a desired TV program from an input TS stream, extracts an A/V elementary stream from the extracted program packets, and outputs the A/V elementary stream. The A/V elementary stream is temporarily stored in the buffer 204, and divided into an audio elementary stream and a video elementary stream, and the divided streams are output.

Here, the audio decoder 206 reproduces an audio signal from the audio elementary stream provided by the buffer 204, and the video decoder 208 reproduces a video signal from the video elementary stream provided by the buffer 204. The reproduced audio signal and video signals are reproduced on a display apparatus (not shown).

Meanwhile, the TS demux control unit 212 controls the TS demux 202 and extracts information related to program packets having I-pictures.

A general purpose microcontroller, such as for example, an ARM7TDMI, is used as the TS demux control unit 212. The TS demux control unit 212 detects and stores packet numbers of packets having data related to I-pictures (a first disk packet, a last disk packet, a first TS packet and a last TS packet).

Where an interrupt signal is received, the TS demux control unit 212 sends these packet numbers to the control unit 214. Here, a disk packet is a unit of data stored in the HDD 218 and usually formed of a plurality of TS packets, for example, 10 TS packets.

The control unit 214 comprises a Central Processing Unit (CPU) 214a, a flash RAM 214b, a PCI control unit 214c, and a RAM 214d. An SA 110 microprocessor is used as the CPU 214a, and generally controls storing, playing, and trick-playing a TV program. Particularly, where a TV program is stored, the control unit 214 extracts information needed in play, for example, attributes information on a packet such as a PAT and a PMT and information on the location of an I-picture for variable speed play, makes a program table having the attribute information, and stores the program table together with program packets into the HDD 218.

Also, the control unit 214 performs setting of registers related to the operation of the TS demux 202, downloading of micro codes needed in the operation of the control unit 214, initializing of PCI interrupt enable registers, Direct Memory Access (DMA), and controlling of PCI card insertion. A program which operates the CPU 214a is stored in the flash RAM 214b.

The RAM 214d temporarily stores TS packets output from the TS demux 202 before the TS packets are stored in the HDD 218, rearranges the TS packets in units of disk packets and then outputs the disk packets. By a Direct Memory Access (DMA) operation, the disk packets are sent through an IDE controller 216, which is an interface apparatus, to the HDD 218 where the disk packets are stored. The IDE controller 216 interfaces the HDD 218 with a data bus 220.

Referring now to FIGS. 3-6, operation of the apparatus shown in FIG. 2 will now be explained in detail. Where a user stores a TV program in the HDD 218, the apparatus according to the present invention shown in FIG. 2 extracts information related to playing the TV program, for example, a PAT, a PMT, and a location of an I-picture, makes a program table, and stores the program table together with program packets in the HDD 218.

1. Storing Program Packets

Figure 3:
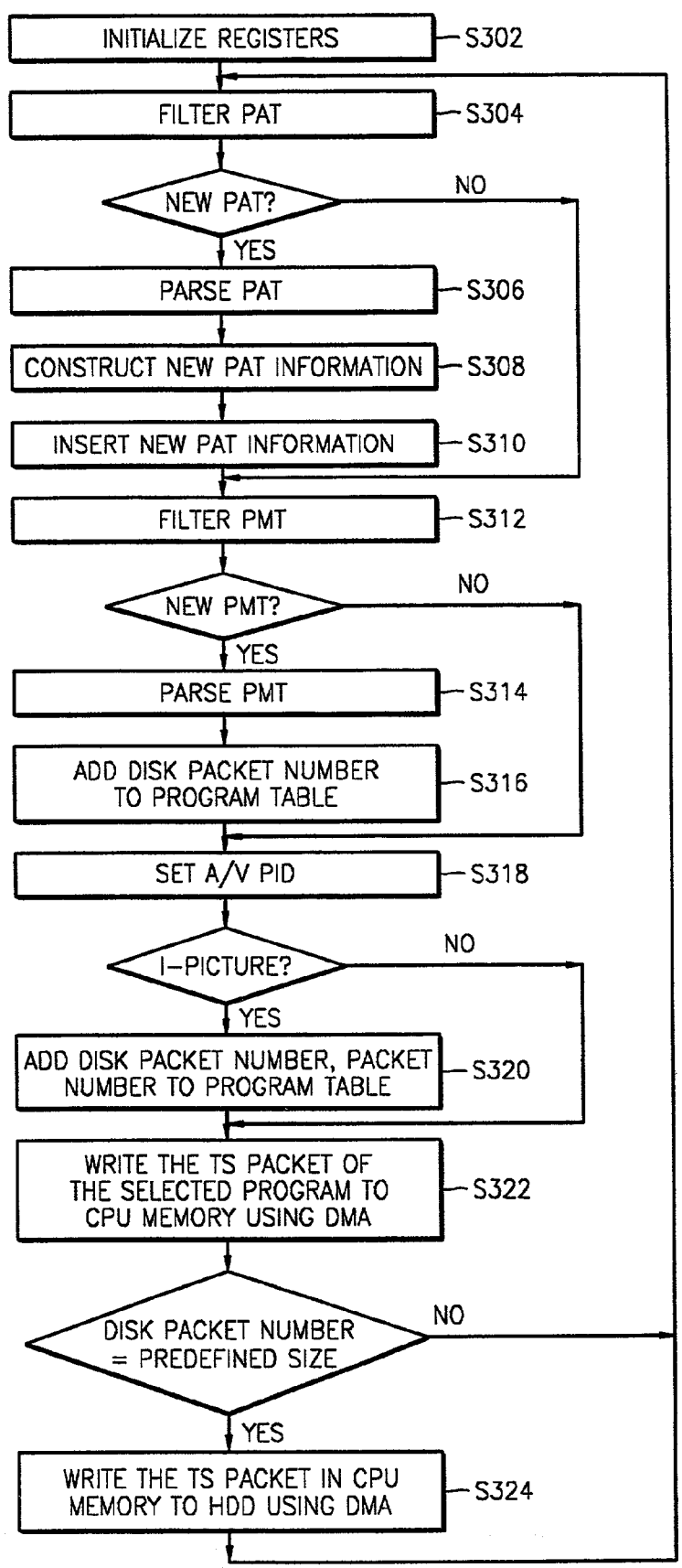
FIG. 3 is a flowchart of a process for storing program packets related to a TV program in the apparatus of FIG. 2.

FIG. 3 is a flowchart of a process for storing program packets related to the TV program in the apparatus of FIG. 2.

First, the control unit 214 sets the TS demux 202 and PCI related registers to appropriate modes for storing the TV program at operation S302. The control unit 214 sets needed parameters so that the TS demux 202 extracts program packets related to the TV program desired to be stored. The TS demux 202 filters a PAT from a TS stream, which is input to the TS demux 202, at operation S304, and parses the PAT at operation S306. Referring to a PID obtained from the PAT, the TS demux 202 extracts program packets related to the TV program. The extracted program packets are stored in the RAM 214d of the control unit 214.

The control unit 214 extracts the PIDs of program packets related to the desired TV program and makes a new PAT at operation S308. The new PAT is inserted to a program packet at operation S310.

The TS demux 202 filters a PMT from a TS stream, which is input to the TS demux 202, at operation S312, and parses the PMT at operation S314. The control unit 214 also inserts the PMT to a program packet. The control unit 214 adds the disk number of the PMT packet to the program table at operation S316. The control unit 214 sets the PID of an A/V elementary stream at operation S318.

The control unit 214 adds information related to I-pictures (disk packet numbers, TS packet numbers) to the program table at operation S320. The information related to I-pictures is provided by the demux control unit 214. The CPU 214a sends an interrupt signal to the TS demux control unit 214. In response to the interrupt signal, the TS demux control unit 212 provides the control unit 212 with the packet number of packets having data related to I-pictures (the last disk packet, the first TS packet, and the last TS packet).

Where the PAT and PMT are updated, operations S306 through S308 and S314 through S318 are performed. This is for a case where the PID of the TV program changes during receiving the TV program.

The program packets related to the selected TV program are first stored in the RAM 214a at operation S322 using DMA and then stored in units of a disk packet in the HDD 218 by DMA operations at operation S324. At this time, information needed for play and trick play is included in the program table. After program packets are stored in the HDD 218, the program table is stored in the HDD 218.

2. Searching for I-Pictures

Figure 4:
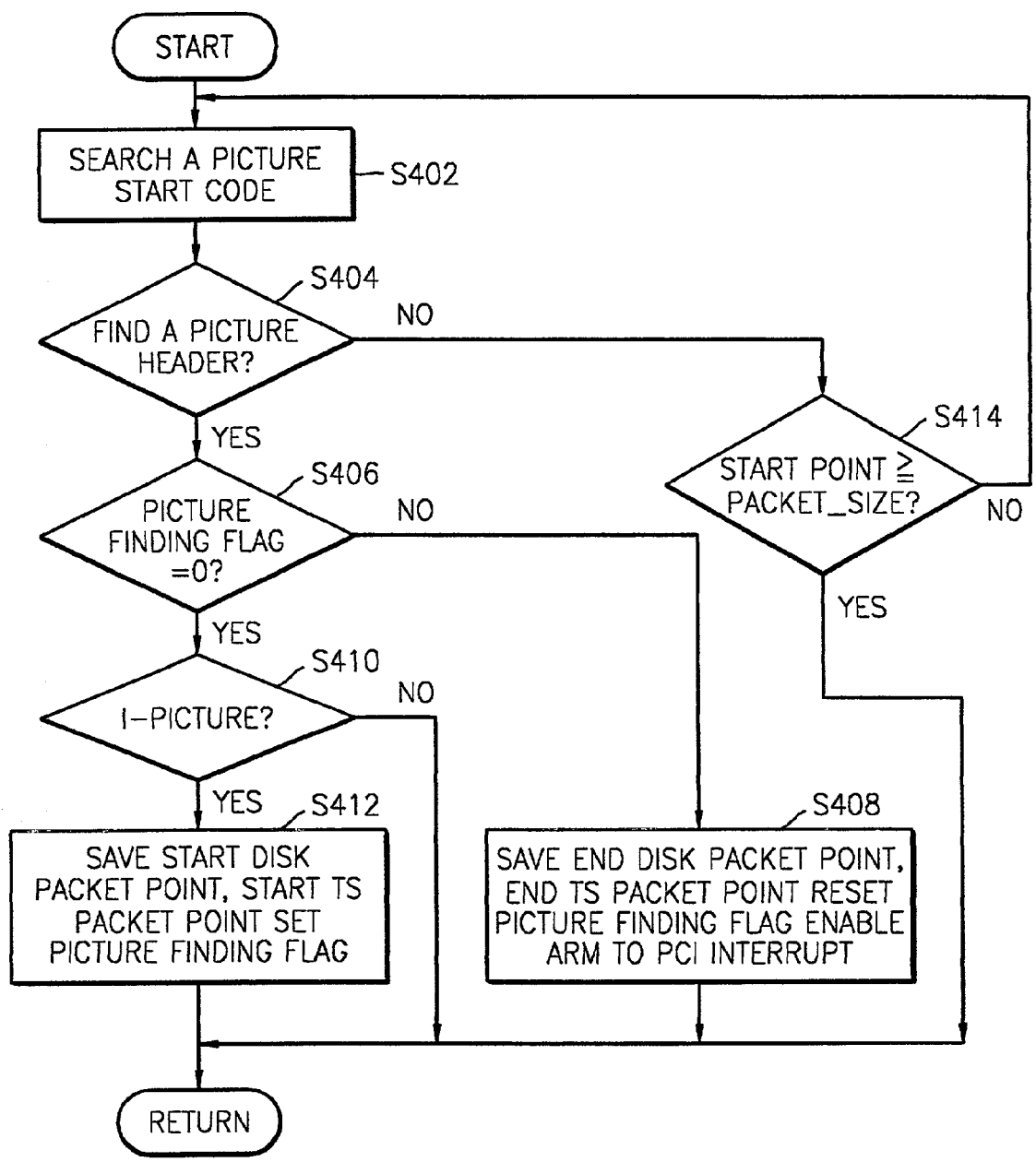
FIG. 4 is a flowchart of a process for extracting information associated with an I-picture in the TS demux control unit 212 shown in FIG. 2.

FIG. 4 is a flowchart of a process for extracting information associated with an I-picture in the TS demux control unit 212 shown in FIG. 2.

The TS demux control unit 212 searches each TS stream for a picture start code at operation S402. Next, the TS demux control unit 212 searches for a picture header at operation S404.

A picture finding flag is checked at operation S406. The picture finding flag is a flag used for controlling the operation of the TS demux control unit 212. If the picture finding flag bit is '0', which indicates the end of an I-picture, the disk packet point and TS packet point are stored in the RAM 214d and the picture finding flag is reset at operation S408.

If the picture finding flag bit is '1', it is determined whether a current TS packet is related to an I-picture at operation S410. If the current TS packet is related to an I-picture, the disk packet point and TS packet point are stored in the RAM 214d and the picture finding flag is set at operation S412.

If a picture header is not found at operation S404, it is determined whether 'start point' is equal to or greater than a packet size, and according to the result of the determination, operation S402 is performed or the process is finished at operation S414.

3. Program Table

The program table is a table that systematically describes information needed in playing or trick-playing the TV program stored in the HDD 218. The program table includes the name of the TV program, broadcasting time, PAT information, PMT information, the location of I-pictures (the disk packet numbers of the first disk packet and the last disk packet and the TS packet numbers of the first TS packet and the last TS packet), and the location of a new PMT.

An example of content of the program table is as follows:

```
program table {program name
    program time
    the number of new PMT
    for(i=0; i < the number of new PMT; i++){
        disk packet number
        video PID
        audio PID
        descriptors
    }
    the number of I-picture number
    for(ii=0; i<the number of I-picture number; i++){
        start disk packet number
        start packet number
```

-continued

```
        end disk packet number
        end packet number
    }
}
```

4. Playing the TV Program

Figure 5:
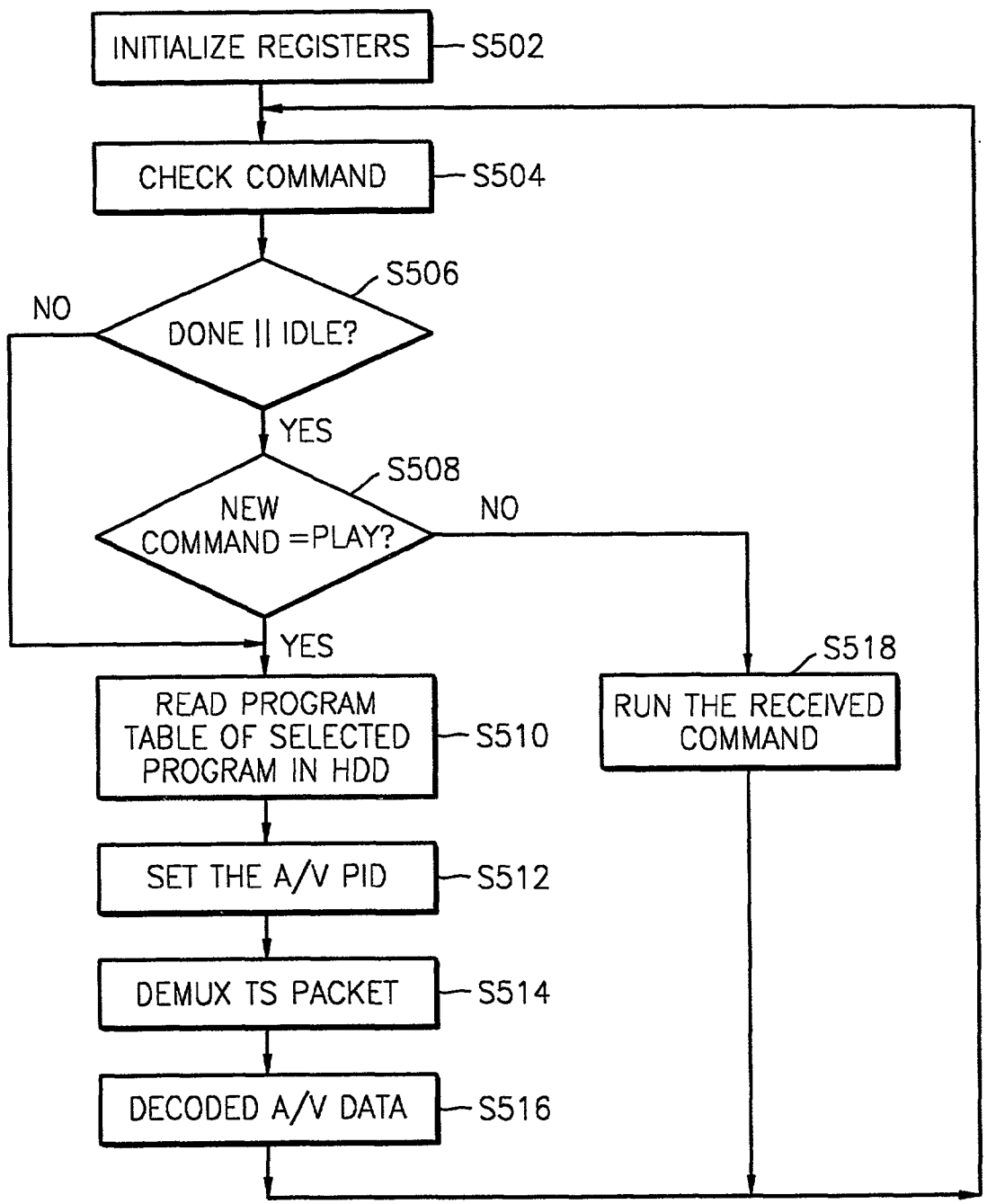
FIG. 5 is a flowchart of a playing process in the apparatus of FIG. 2.

FIG. 5 is a flowchart of a playing process in the apparatus of FIG. 2. First, the control unit 214 sets the TS demux 202 and PCI related registers needed in playing at operation S502.

The control unit 214 checks a command at operation S504. A command is sent through the host PC 222, shown in FIG. 2, to the control unit 214. It is checked whether the command is executed or whether the apparatus is in an idle state at operation S506. If the command is not executed and the apparatus is not in an idle state, it is checked whether the command is PLAY at operation S508.

If the command is PLAY, the program table of the TV program selected for playing is read from the HDD 218 at operation S510, the PID is set according to the program table at operation S512, packet data is read from the HDD 218 and input to the TS demux 202 at operation S514, and the audio elementary stream and video elementary stream are reproduced through the audio decoder 208 and the video decoder 210 at operation S516.

Figure 6:
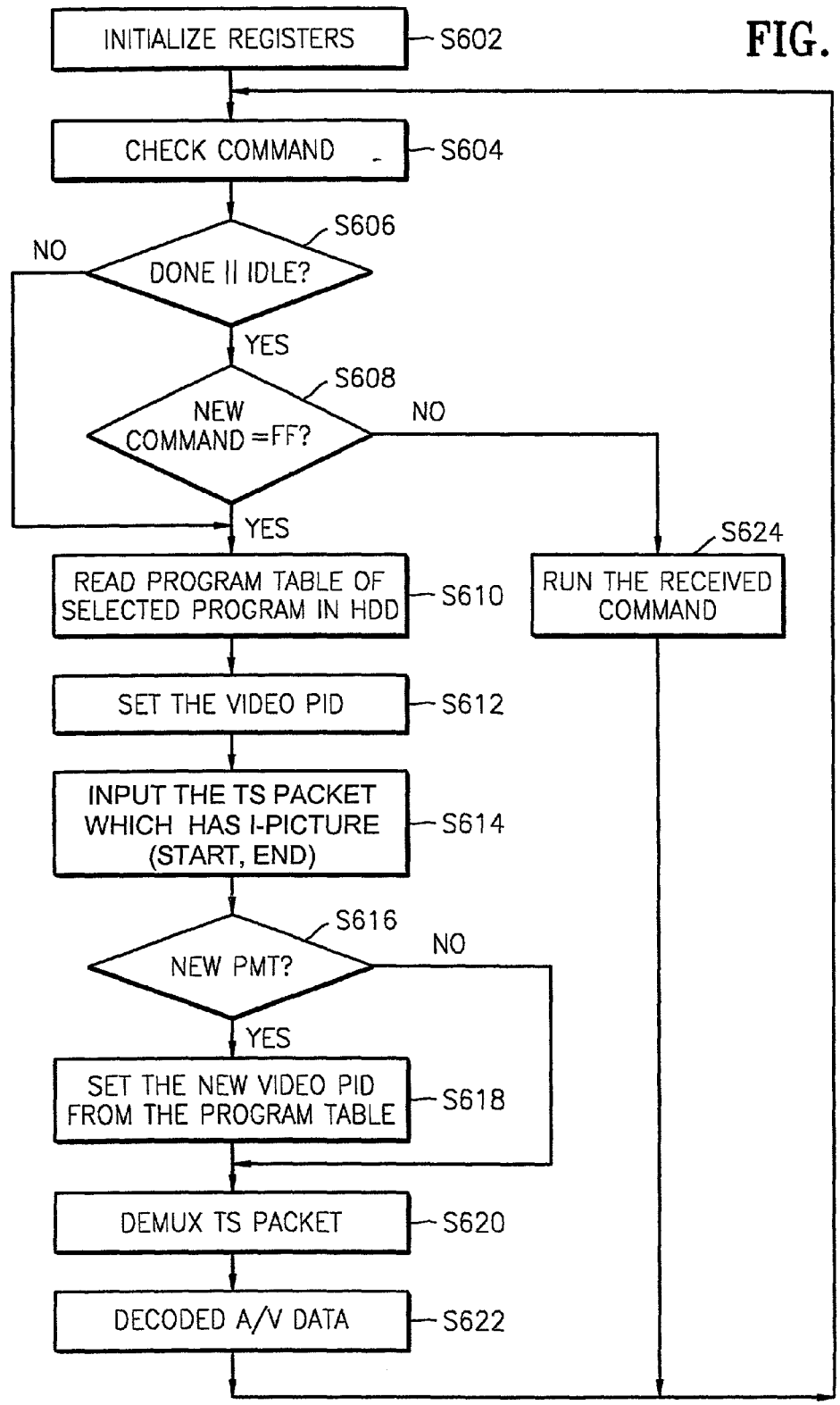
FIG. 6 is a flowchart of a Fast Find (FF) operation in the apparatus of FIG. 2.

If the command at operation S508 is not PLAY, an operation corresponding to the command, for example, a trick play operation as shown in FIG. 6, is executed at operation S518.

5. Trick Play

FIG. 6 is a flowchart of a Fast Find (FF) operation that is a kind of trick play in the apparatus of FIG. 2.

First, the control unit 214 sets the TS demux 202 and PCI related registers to appropriate modes for playing the TV program. Then, the control unit 214 checks a command at operation S604. The control unit 214 checks whether the command is executed or whether the apparatus is in an idle state at operation S606. If the command is not executed and the apparatus is not in an idle state, the control unit 214 checks whether the command is Fast Find (FF) at operation S608.

If the command is FF, the control unit 214 reads the program table of the TV program selected for FF from the HDD 218 at operation S610, sets Video PID according to the program table at operation S612, and reads a disk packet having an I-picture from the HDD 218. The program table has information on a program packet having the I-picture. Since audio data is not reproduced in the FF operation, no operation for reproducing the audio elementary stream is needed.

The control unit 214 checks whether a PMT is a new PMT at operation S616. If the PMT is a new PMT, the control unit 214 sets Video PID according to the program table at operation S618.

The program packet having the I-picture is read from the HDD 218, input to the TS demux 202 at operation S620, and reproduced through the video decoder 210 at operation S622.

If the command is not FF, an operation corresponding to the command is performed at operation S624.

As described above, where data related to a TV program is stored, the method of storing a TV program according to the present invention extracts information which is referred to in playing the TV program, stores the information in a separate program table so that that program table can be referred to in playing the TV program. Therefore, it becomes easier to play or trick-play the TV program.

Also, where a TV program is stored, the apparatus for storing a TV program according to the present invention produces a program table having information related to playing the TV program, and stores the program table together with the TV program so that play and trick play of the TV program become easier by referring to the program table. Additionally, this invention may also be used to provide a guide to programs stored on an HDD, such as for example, showing a list of recorded programs, or views of stored scenes.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of storing program data, which is encoded by compression, comprising:
   extracting information related to a desired program, which is to be referenced in reproducing the program data of the desired program, from the program data, the extracted information including information associated with an I-picture that is extracted by:
      searching a transport stream (TS) for the I-picture, and saving a start disk packet point and TS packet point if a current TS packet is related to the I-picture;
   making a table of the extracted information, the table including only information to be referenced in reproducing the program data of the desired program at variable speed; and
   storing the table having the extracted information with the program data of the desired program in a storage apparatus,
   wherein the program data is encoded by compression according to the MPEG-2 standard and packetized as packets in the form of the TS,
   wherein the extracting of the information comprises extracting a program allocation table (PAT), a program map table (PMT), location information of the I-picture, and description information of each packet, and
   wherein the program data of the desired program is reproduced by referring to the extracted information stored in the table.

2. An apparatus to store a program which is encoded and packetized in transport stream (TS) packets according to an MPEG-2 standard, the apparatus for storing a program comprising:
   a TS demux which extracts program packets related to a program desired to be stored from the TS packets;
   a TS demux control unit which controls the TS demux to extract the program packets, and extracts location information of an I-picture including extracting description information of each packet;
   a control unit which:
      buffers and outputs the program packets extracted by the TS demux,
      extracts program allocation table (PAT), program map table (PMT) information related to the program desired to be stored from the program packets,
      extracts information associated with the I-picture by searching the TS for the I-picture and saving a start disk packet point and TS packet point if a current TS packet is related to the I-picture, and
      makes a program table having the extracted PAT information, the PMT information, and the location information of the I-picture, including the description information, the program table including only information to be referenced in reproducing the program data of the desired program at variable speed; and
   a storing apparatus which stores the program packets and the program table,
   wherein the program data of the desired program is reproduced by referring to the extracted information stored in the table.

3. The apparatus for storing a program of claim 2, wherein the control unit comprises:
   a random-access-memory (RAM) which buffers and outputs the program packets detected by the TS demux; and
   a central processing unit (CPU) which extracts the PAT information and the PMT information from the program packets stored in the RAM according to a predetermined program, and makes the program table.

4. The apparatus for storing a program of claim 2, further comprising:
   a digital interface unit which controls a direct memory access (DMA) operation between the storing apparatus and the control unit.

5. The apparatus for storing a program of claim 2, wherein the storing apparatus is a hard disc drive.

6. A method, comprising:
   extracting information from program data stored in packets to be referenced during reproduction of the program data, the extracted information including information associated with an I-picture that is extracted by searching a transport stream (TS) for the I-picture and saving a start disk packet point and TS packet point if a current TS packet is related to the I-picture;
   creating a table containing the extracted information, the table including only information to be referenced in reproducing the program data of the desired program at variable speed;
   storing the created table with the program data in storage; and
   reproducing the program data of the desired program by referring to the extracted information stored in the table,
   wherein the extracting of the information comprises extracting location information of the I-picture, and description information of each packet.

7. The method of claim 1, wherein the making a table of the extracted information comprises making a new PMT or PAT table.

8. The method of claim 1, further comprising:
   wherein the location information includes a disk packet number of a first one of the disk packets, a disk packet number of a last one of the disk packets, a TS packet number of a first one of the TS packets, and a TS packet number of a last one of the TS packets.

* * * * *

UNITED STATES PATENT AND TRADEMARK OFFICE
CERTIFICATE OF CORRECTION

| | | |
|---|---|---|
| PATENT NO. | : 7,912,357 B2 | Page 1 of 1 |
| APPLICATION NO. | : 10/067301 | |
| DATED | : March 22, 2011 | |
| INVENTOR(S) | : Choon-sik Jung | |

It is certified that error appears in the above-identified patent and that said Letters Patent is hereby corrected as shown below:

Column 1, Line 8 delete "Dec. 11, 2001" and insert -- Jul. 25, 2001 --, therefor.

Signed and Sealed this

Thirty-first Day of May, 2011

David J. Kappos
*Director of the United States Patent and Trademark Office*